US009868057B2

(12) United States Patent
Ikenaga et al.

(10) Patent No.: US 9,868,057 B2
(45) Date of Patent: Jan. 16, 2018

(54) INFORMATION PROCESSING SYSTEM, INFORMATION PROCESSING METHOD, INFORMATION PROCESSING PROGRAM, AND COMPUTER-READABLE STORAGE MEDIUM STORING THE INFORMATION PROCESSING PROGRAM

(71) Applicant: Sony Computer Entertainment Inc., Tokyo (JP)

(72) Inventors: Toshiya Ikenaga, Tokyo (JP); Makoto Ishii, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/071,642

(22) Filed: Mar. 16, 2016

(65) Prior Publication Data
US 2016/0193528 A1 Jul. 7, 2016

Related U.S. Application Data

(63) Continuation of application No. 13/990,232, filed as application No. PCT/JP2011/073859 on Oct. 17, 2011, now Pat. No. 9,320,965.

(30) Foreign Application Priority Data

Dec. 10, 2010 (JP) ................................ 2010-275863

(51) Int. Cl.
*A63F 13/00* (2014.01)
*A63F 13/23* (2014.01)
(Continued)

(52) U.S. Cl.
CPC .............. *A63F 13/23* (2014.09); *A63F 13/12* (2013.01); *A63F 13/20* (2014.09); *A63F 13/22* (2014.09);
(Continued)

(58) Field of Classification Search
CPC .......... A63F 2300/10; A63F 2300/1018; A63F 2300/1025; A63F 2300/1031; A63F 13/20; A63F 13/22; A63F 13/23; A63F 13/235
(Continued)

(56) References Cited

U.S. PATENT DOCUMENTS 6,939,232 B2  9/2005  Tanaka
7,024,501 B1  4/2006  Wright
(Continued)

FOREIGN PATENT DOCUMENTS

CN   101517537 A   8/2009
EP   2065801 A1   6/2009
(Continued)

OTHER PUBLICATIONS

International Search Report for corresponding PCT Application PCT/JP2011/073859, 2 pages, dated Jan. 10, 2012.
(Continued)

*Primary Examiner* — James S McClellan
(74) *Attorney, Agent, or Firm* — Matthew B. Dernier, Esq.

(57) ABSTRACT

Methods and apparatus provide for: executing a game program in response to each of a plurality of operation signals that input to each of the plurality of ports of a controller port from a plurality of operation devices, wherein the controller port comprises the plurality of ports to which the plurality of operation signals are input from the plurality of operation devices via a network; assigning the plurality of the operation devices to the plurality of ports; obtaining connection information indicating a connection status between the plurality of ports and the plurality of operation devices; and
(Continued)

changing the assignment of the plurality of operation devices to the plurality of ports depending on the obtained connection status.

22 Claims, 9 Drawing Sheets

(51) Int. Cl.
    *A63F 13/843*    (2014.01)
    *A63F 13/22*    (2014.01)
    *A63F 13/40*    (2014.01)
    *A63F 13/30*    (2014.01)
    *A63F 13/20*    (2014.01)
    *A63F 13/32*    (2014.01)

(52) U.S. Cl.
    CPC .............. *A63F 13/32* (2014.09); *A63F 13/40* (2014.09); *A63F 13/843* (2014.09); *A63F 2300/1031* (2013.01); *A63F 2300/402* (2013.01); *A63F 2300/403* (2013.01); *A63F 2300/636* (2013.01)

(58) Field of Classification Search
    USPC .......................................................... 463/42
    See application file for complete search history.

(56) References Cited

U.S. PATENT DOCUMENTS

| | | |
|---|---|---|
| 7,264,548 B2 | 9/2007 | Tanaka |
| 8,369,795 B2 | 2/2013 | Glaser |
| 2002/0072410 A1 | 6/2002 | Tanaka |
| 2005/0026695 A1 | 2/2005 | Tsuchiyama et al. |
| 2005/0245316 A1 | 11/2005 | Tanaka |
| 2006/0068917 A1 | 3/2006 | Snoddy et al. |
| 2006/0154725 A1 | 7/2006 | Landers |
| 2007/0281791 A1 | 12/2007 | Ichikawa |
| 2009/0079690 A1 | 3/2009 | Watson |
| 2009/0156136 A1 | 6/2009 | Shimizu |
| 2009/0307173 A1 | 12/2009 | Tzruya |
| 2010/0017190 A1 | 1/2010 | Tanaka |

FOREIGN PATENT DOCUMENTS

| | | |
|---|---|---|
| JP | 2001038050 A | 2/2001 |
| JP | 2002202843 A | 7/2002 |
| JP | 2006192259 A | 7/2006 |
| JP | 2007307303 A | 11/2007 |
| JP | 2008077411 A | 4/2008 |
| JP | 2008194162 A | 8/2008 |
| WO | 2007032248 A1 | 3/2007 |

OTHER PUBLICATIONS

International Preliminary Report on Patentability and Written Opinion for corresponding PCT Application PCT/JP2011/073859, 7 pages, dated Jun. 20, 2013.
International Preliminary Report on Patentability and Written Opinion for corresponding PCT Application PCT/JP2011/073860, 7 pages, dated Jun. 20, 2013.
'Windows Machine de Kateiyo Game-ki no Soft o Tanoshimo', PC Japan, Japan, Softbank Publishing Inc., ,vol. 7, No. 4, 13 pages, Apr. 1, 2002 (for relevancy see p. 4, paragraph 5 of Written Opinion for PCT/JP2011/073860).
Japanese Office Action for corresponding JP Application 2010-275864, 2 pages, dated Nov. 26, 2013.
Office Action for corresponding application CN 2011800656138, 5 pages, dated Oct. 20, 2014.
Examination Report for corresponding application AU 2011339857, 3 pages, dated Apr. 21, 2015.
Office Action for corresponding U.S. Appl. No. 13/990,232, 9 pages, dated Apr. 9, 2015.
Office Action for corresponding U.S. Appl. No. 13/990,232, 8 pages, dated Oct. 9, 2015.
European Search Report for corresponding EP Application 11847832, 9 pages, dated Sep. 27, 2017.

FIG.5

| a | b | c | d | e | f |
|---|---|---|---|---|---|
| 1 | 0 | 0 | 1 | 1 | 0 |

FIG.6

| PORT ID | OPERATION UNIT ID |
|---|---|
| 1P | A |
| 2P | B |
| 3P | C |
| 4P | D |
| ⋮ | ⋮ |

FIG.7A

| EXECUTION STATUS ID | PORT ID | OPERATION UNIT ID |
|---|---|---|
| a1 | 1P | A |
| a2 | 1P | B |
| a3 | 1P | A |
| a4 | 1P | B |
| ⋮ | ⋮ | ⋮ |

FIG.7B

| PORT ID | EXECUTION STATUS ID | OPERATION UNIT ID |
|---|---|---|
| 1P | b1 | A1 |
| 1P | b2 | A2 |
| 1P | b3 | A3 |
| 1P | b4 | A4 |
| 2P | c1 | B1 |
| 2P | c2 | B2 |
| 2P | c3 | B3 |
| 2P | c4 | B4 |
| ⋮ | ⋮ | ⋮ |

FIG.10A

| PORT ID | OPERATION UNIT ID |
|---|---|
| 1P | B |
| 2P | B |
| 3P | C |
| 4P | D |
| ⋮ | ⋮ |

FIG.10B

| PORT ID | OPERATION UNIT ID |
|---|---|
| 1P | E |
| 2P | B |
| 3P | C |
| 4P | D |
| ⋮ | ⋮ |

FIG.11

| PORT ID | OPERATION INFORMATION ID | OPERATION UNIT ID | INPUT INFORMATION ID |
|---|---|---|---|
| 1P | a | A | aa |
| | b | A | bb |
| | c | B | cc |
| | d | B | dd |
| 2P | a | C | aa |
| | b | C | bb |
| | c | D | cc |
| | d | D | dd |
| ⋮ | ⋮ | ⋮ | ⋮ |

FIG.12

| PORT ID | OPERATION INFORMATION ID | OPERATION UNIT ID | INPUT INFORMATION ID |
|---|---|---|---|
| 1P | a | A | aa |
| | b | A | bb |
| | c | A | cc |
| | c | B | cc |
| | d | A | dd |
| | d | B | dd |
| 2P | a | C | aa |
| | b | C | bb |

INFORMATION PROCESSING SYSTEM, INFORMATION PROCESSING METHOD, INFORMATION PROCESSING PROGRAM, AND COMPUTER-READABLE STORAGE MEDIUM STORING THE INFORMATION PROCESSING PROGRAM

CROSS-REFERENCE TO RELATED APPLICATIONS

This application is a continuation of U.S. patent application Ser. No. 13/990,232, filed May 29, 2013, which is a national phase application of PCT/JP2011/073859, filed Oct. 17, 2011, with claims the benefit of JP 2010-275863, filed Dec. 10, 2010, the entire disclosures of which are hereby incorporated by reference.

TECHNICAL FIELD

The present invention relates to an information processing system, an information processing method, an information processing program, and a computer-readable recording medium having an information processing program stored thereon.

BACKGROUND ART

There has been known a technology for executing a game program that is created to be executed on a dedicated device on a different device or the like by using an emulator.

SUMMARY OF INVENTION

Technical Problem

However, in such a case as described above, for example, a plurality of persons may wish to play the game program created so as to be played by, for example, only one player. Further, in a case where, for example, the game program is a golf game in which a plurality of players hit a ball in order, if the golf game is executed in a server-type system for executing a game, when a connection between the server and an operation device corresponding to one player is disconnected, it is difficult to proceed with the golf game. Further, in a case where, for example, a plurality of buttons of one controller are used to operate an object to be controlled in the game program, a plurality of users may wish to share the plurality of buttons.

An object of one or more embodiments of the present invention is to provide an information processing system and the like capable of adding a new way of enjoying a game program created to be executed on a dedicated device, for example, of providing the game program with a function of realizing a social game or the like that allows a plurality of players to play one game.

Solution to Problem

According to the present invention, an information processing system includes a controller port including a plurality of ports to which a plurality of operation signals are input from a plurality of operation devices via a network; an execution unit configured to execute a game program in response to each of the plurality of operation signals input from each of the plurality of operation devices to each of the plurality of the ports; and an assignment unit configured to assign each of the plurality of operation devices to each of the plurality of respective ports. The assignment unit changes assignment of each of the plurality of operation devices to each of the plurality of ports in a predetermined case.

According to the present invention, an information processing method includes executing a game program in response to each of a plurality of operation signals that input to each of the plurality of ports of a controller port from a plurality of operation devices, wherein the controller port comprises the plurality of ports to which the plurality of operation signals are input from the plurality of operation devices via a network; assigning each of the plurality of the operation devices to each of the plurality of ports; and changing assignment of each of the plurality of operation devices to each of the plurality of ports in a predetermined case.

According to the present invention, an information processing program for causing a computer to function as: a controller port unit comprising a plurality of ports to which a plurality of operation signals are input from a plurality of operation devices via a network; an execution unit configured to execute a game program in response to each of the plurality of operation signals input from each of the plurality of operation devices to each of the plurality of ports; and an assignment unit configured to assign each of the plurality of operation devices to each of the plurality of ports. The assignment unit changes assignment of each of the plurality of operation devices to each of the plurality of ports in a predetermined case.

Advantageous Effects of Invention

It is possible to provide the information processing system and the like capable of adding a new way of enjoying a game program that is created to be executed on a dedicated device, for example, of providing the game program with a function of realizing a social game or the like that allows a plurality of players to play one game.

BRIEF DESCRIPTION OF DRAWINGS

FIG. 5 A diagram for illustrating an example of operation information obtained by an operation information obtaining unit.

FIG. 6 A diagram illustrating an example of an assignment table.

FIG. 7A A diagram illustrating another example of the assignment table.

FIG. 7B A diagram illustrating another example of the assignment table.

FIG. 10A A diagram illustrating an example of the changed assignment table.

FIG. 10B A diagram illustrating an example of the changed assignment table.

FIG. 11 A diagram illustrating an example of an assignment table according to Modified Example 1 of the present invention.

FIG. 12 A diagram illustrating an example of an assignment table according to Modified Example 2 of the present invention.

DESCRIPTION OF EMBODIMENTS

Figure 1:
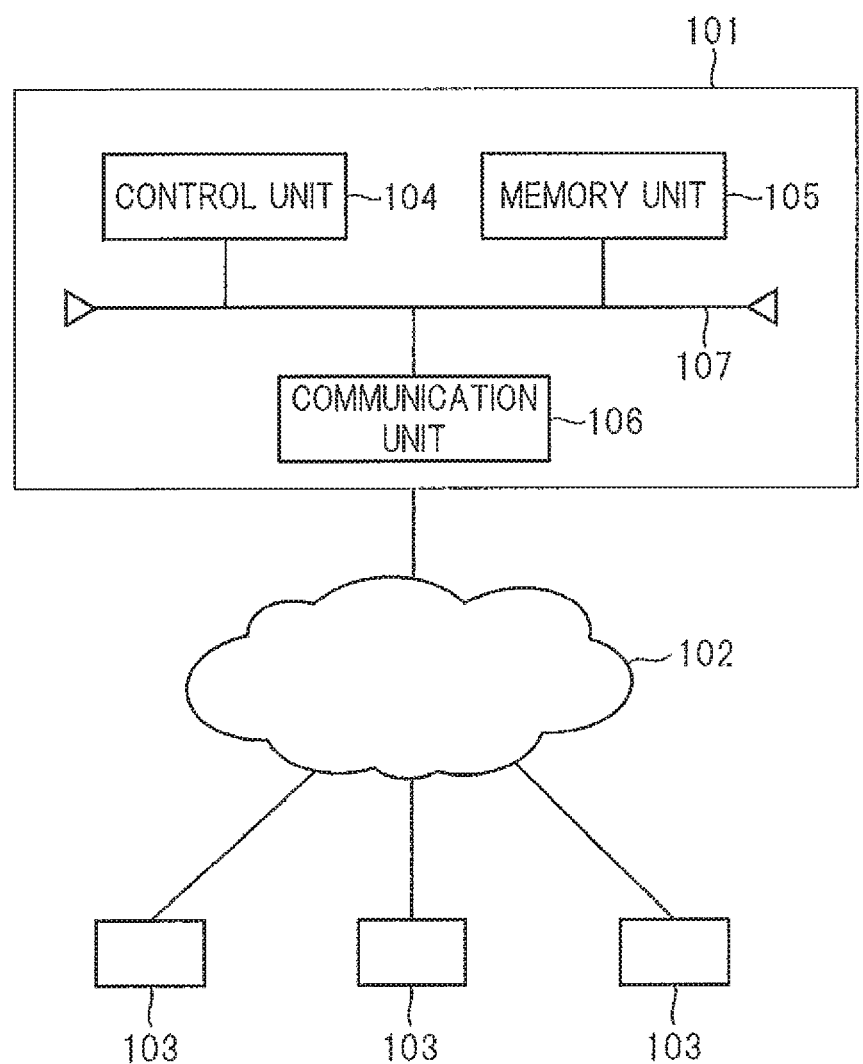
FIG. 1 A diagram for illustrating an information processing system according to an embodiment of the present invention.

A description is now given of an embodiment of the present invention referring to the drawings. Note that, throughout the drawings, the same or corresponding components are denoted by the same reference numerals, and a duplicated description thereof is therefore omitted.

FIG. 1 is a diagram illustrating an information processing system according to the embodiment of the present invention. As illustrated in FIG. 1, the information processing system of one or more embodiments of the present invention includes a server 101, a network 102, and a plurality of terminals 103. The server 101 includes a control unit 104, a memory unit 105, and a communication unit 106. The respective units 104 and 105 are connected to each other via a bus 107. Note that, in FIG. 1, three terminals 103 are illustrated, but the number of terminals 103 may differ.

The control unit 104 is, for example, a CPU or an MPU, and operates in accordance with a program stored in the memory unit 105. The memory unit 105 includes an information recording medium such as a hard disk drive, a ROM, or a RAM, and is an information recording medium having stored thereon programs executed by the control unit 104. Moreover, the memory unit 105 also operates as a work memory for the control unit 104. Note that, the programs processed by the control unit 104 may be downloaded and provided, for example, via the network 102, or may be provided by means of various computer-readable information recording media such as a CD-ROM and a DVD-ROM.

The communication unit 106 is, for example, a network interface, and transmits/receives information via the network 102 in response to an instruction issued from the control unit 104.

Figure 2:
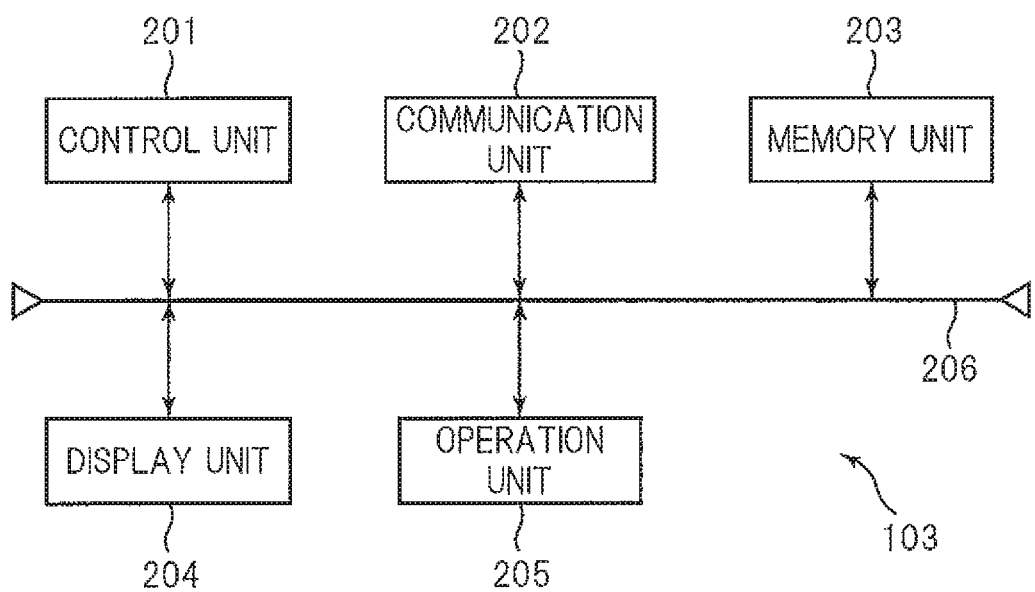
FIG. 2 A diagram for illustrating a configuration of a terminal.

FIG. 2 is a diagram for illustrating a configuration of a terminal. As illustrated in FIG. 2, the terminal 103 includes a control unit 201, a communication unit 202, a memory unit 203, a display unit 204, and an operation unit 205. Note that, the respective units 201 to 205 are connected to one another via a bus 206. Similarly to the server 101, the control unit 201 is, for example, a CPU or an MPU, and operates in accordance with a program stored in the memory unit 203. The memory unit 203 includes an information recording medium such as a hard disk drive, a ROM, or a RAM, and is an information recording medium having stored thereon programs executed by the control unit 201. Moreover, the memory unit 203 also operates as a work memory for the control unit 201. Note that, the programs processed by the control unit 201 may be downloaded and provided, for example, via the network 102, or may be provided by means of various computer-readable information recording media such as a CD-ROM and a DVD-ROM. The communication unit 202 is, for example, a network interface, and transmits/receives information via the network 102 in response to an instruction issued from the control unit 201.

The operation unit 205 includes, for example, an interface such as a keyboard, a mouse, a controller, and a button, and outputs, in response to an instruction operation by a user, details of the instruction operation to the control unit 201. Note that, the terminal 103 may include a plurality of operation units 205, for example, two or more controllers. Further, an operation device described in Claims corresponds to, for example, the operation unit 205.

The display unit 204 is, for example, a liquid crystal display, a CRT display, or an organic EL display, and displays information as instructed by the control unit 201. Note that, the configuration of the terminal 103 is described above as an example, and the present invention is not limited thereto.

Figure 3:
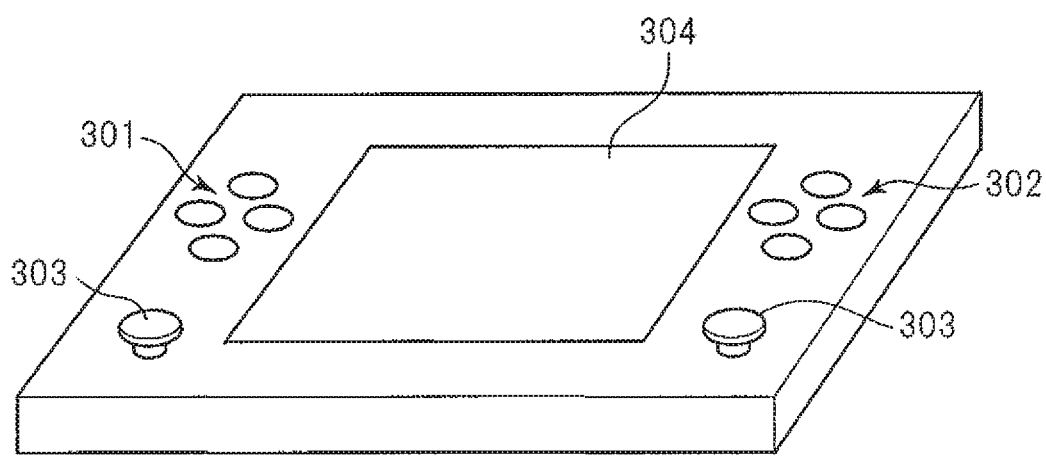
FIG. 3 A diagram illustrating an example of an external appearance of the terminal.

FIG. 3 is a diagram illustrating an example of the external appearance of the terminal 103. As illustrated in FIG. 3, for example, the terminal 103 has, as the operation unit 205, direction keys 301, a plurality of buttons 302, and analog operation units 303, and has a display screen 304 as the display unit 204.

The direction keys 301 include, for example, an upward direction instructing key, a downward direction instructing key, a rightward direction instructing key, and a leftward direction instructing key. With the direction keys 301, the user moves an object to be controlled in a game up, down, to the left, or to the right, for example. Each of the plurality of buttons 302 is marked with, for example, a, b, c, or d. The user pushes these buttons 302 to execute, for example, processing procedures assigned to the respective buttons by a game program that is being executed.

The analog operation units 303 can each be operated so as to, for example, tilt from a predetermined reference position, and the user inputs input information which reflects the amount and direction of tilt of the analog operation unit 303 from the reference position. For instance, the user can use one of the analog operation units 303 to tilt an object to be controlled displayed on the display screen 304 in a desired direction by a desired amount in connection with the amount and direction of tilt of the analog operation unit 303. Further, the analog operation unit 303 is a so-called analog button, in other words, for example, a button for inputting an amount by which a user presses the button from a predetermined reference position, and may be configured so as to be able to operate the object to be controlled in connection with the pressed amount. Further, the display screen 304 corresponds to the display screen 304 of the display unit 204, and, for example, displays an image or the like corresponding to a game program.

Note that, the external appearance of the terminal 103 that is illustrated in FIG. 3 and the configurations of the operation unit 205 and the display unit 204 are given as an example, and the present invention is not limited thereto. For instance, the operation unit 205 may be constituted of a touch panel screen displayed by the display unit 204, and the display unit 204 may be a display screen of a monitor constituted of a CRT or a liquid crystal display device, or other displays. The number of the direction keys 301, the number of the plurality of buttons 302, and the number of the analog operation units 303 may be other numbers than those given above. The terminal 103 may include other buttons such as a start button and a select button (not shown), an acceleration sensor, and the like. Further, the terminal 103 includes, for example, the operation unit held by the user's hand or the like, and may be configured so as to be able to operate the object to be controlled in connection with movement of the user's hand or the like. In this case, for example, the terminal 103 obtains position information on the operation unit by image recognition or the like, and the object to be controlled is operated by using input information based on the position information. In addition, the terminal 103 may include a plurality of operation units each of which is formed of the direction keys 301, the plurality of buttons 302, the analog operation units 303, and the like.

Figure 4:
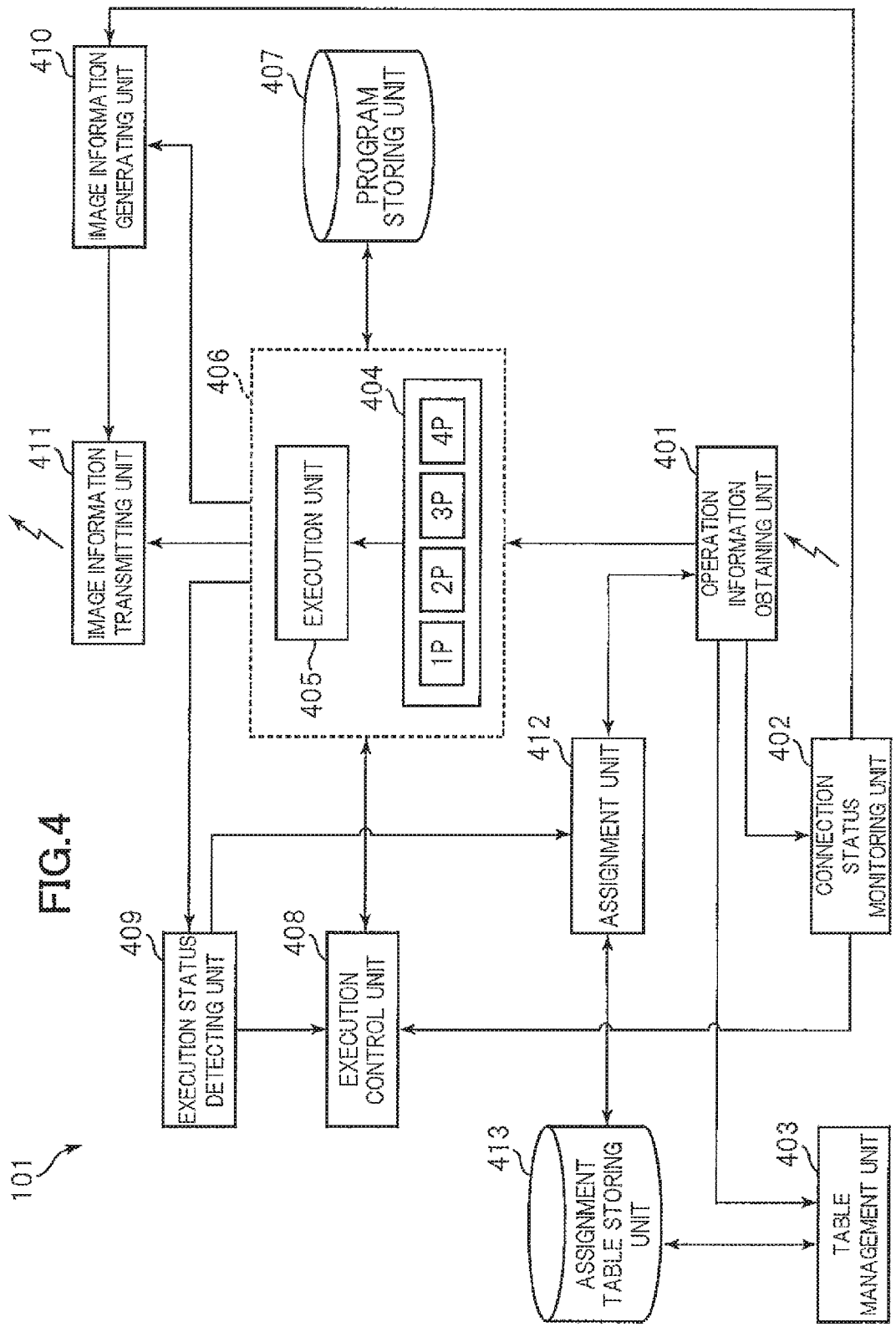
FIG. 4 A diagram for illustrating a functional configuration of a server.

FIG. 4 is a diagram for illustrating a functional configuration of the server. As illustrated in FIG. 4, the server 101 includes an operation information obtaining unit 401, a connection status monitoring unit 402, a table management unit 403, a controller port 404, an execution unit 405, a program storing unit 407, an execution control unit 408, an execution status detecting unit 409, an image information generating unit 410, an image information transmitting unit 411, an assignment unit 412, and an assignment table storing unit 413.

The operation information obtaining unit 401 obtains, for example, respective pieces of operation information input to each of the operation units 205. For example, in a case where a given game program is played by using respective buttons corresponding to button identification information pieces a to f, for each of the operation units 205, as illustrated in FIG. 5, the operation information obtaining unit 401 obtains respective values of, for example, 1 or 0 indicating whether or not the buttons corresponding to the above-mentioned button identification information pieces a to f have been pressed down, for example, every predetermined period (for example, every frame period).

Note that, the operation information of 1 or 0 indicating whether or not the respective buttons have been pressed down is described above, but, in a case where, for example, the analog operation unit 303 is used, the operation information obtaining unit 401 may be configured so as to obtain the operation information corresponding to the amount and direction of the tilt of the analog operation unit 303 from the reference position and the operation information corresponding to the amount by which the button is pressed from the reference position (for example, value of 0 to 100 or analog value itself) or the operation information corresponding to the above-mentioned position information.

The connection status monitoring unit 402 monitors a connection status between the respective operation units 205 and the server 101. Then, in a case where, for example, a predetermined time has elapsed without an input of the operation information from the operation unit 205 of the connected terminal 103, it is determined that a connection between the operation unit 205 and the server 101 has been disconnected.

The table management unit 403, for example, sets and changes details of an assignment table in response to the user's instruction issued through the corresponding operation unit 205 or the like. Specifically, for example, as illustrated in FIG. 6, the table management unit 403 sets the assignment table so that an operation unit identification information piece (operation unit ID) A is stored in association with a port 1P of the controller port 404, and after that, in response to the user's another instruction issued through the corresponding operation unit 205 or the like, a change is made so that an operation unit identification information piece B is stored in association with the port 1P of the controller port 404. Note that, in addition to the user's instruction, the table management unit 403 may be configured to change the assignment table in accordance with a rule for changing the assignment table which is stored in advance.

The execution unit 405 executes the game program stored in the program storing unit 407 based on each piece of operation information input to the controller port 404. Here, the execution unit 405 and the controller port 404 are realized by an emulator 406 or a simulator of a game machine targeted for the game program. Alternatively, the execution unit 405 and the controller port 404 may be formed of the game machine itself.

The program storing unit 407 stores one or a plurality of game programs. Then, the execution unit 405 obtains, for example, the game program selected by the user from the program storing unit 407, and executes the game program. Note that, snapshot data including values in a memory and values of a register of a game machine reproduced by the above-mentioned emulator 406 or the like may be previously stored in, for example, the memory unit 203 or an external database, and the execution unit 405 may execute the corresponding game program by using the snapshot data. In this case, for example, the game program can be executed from a predetermined time point of the game program, for example, a predetermined stage or a time point at which a given character appears.

The controller port 404 corresponds to the controller port 404 of the game machine reproduced by the emulator 406 or the simulator, or in a case where the game machine itself is implemented, corresponds to the controller port 404 of the game machine. Therefore, for example, the controller port 404 includes respective ports, to which the respective pieces of operation information are input from the respective operation units 205, such as the 1P port connected to the controller 1 (first operation unit 205) regarding the player 1 of the game program and a 2P port connected to the controller 2 (second operation unit 205) regarding the player 2 of the game program. Note that, the respective pieces of operation information input from the respective operation units 205 are set in advance so as to correspond to the respective pieces of operation information previously assumed by the game program.

The execution control unit 408 controls the execution unit 405 to start or end the game program. Specifically, for example, the execution of the game program is started in response to the user's instruction to start the game issued through the operation unit 205, or when the connection status monitoring unit 402 determines that the connection to the operation unit 205 corresponding to a given user, who is playing the game, has been disconnected, the execution unit 405 is stopped until another user who is to substitute the given user is set. Further, the execution control unit 408 may finish the execution of the game program performed by the execution unit 405 when the execution status detecting unit 409 described later recognizes, for example, a game end screen to thereby detect the end of the game.

The execution status detecting unit 409 detects image information, sound information, or the like in a predetermined scene, such as a scene where a given game shifts from a stage 1 to a stage 2 or a given character shifts to another character when the given character is defeated in a fighting game, during the progress of the game (predetermined execution status of the game), for example, based on the assignment table described later.

Specifically, the execution status detecting unit 409 uses, for example, a known image recognition technology to detect various predetermined scenes including an image displayed in a case where a stage of a given game shifts from the stage 1 to the stage 2 such as an image for displaying a given character appearing in the fighting game or having been defeated to be replaced by a next character therein.

Note that, in addition to the above-mentioned image recognition technology, for example, a voice within the predetermined scene may be recognized by using speech recognition to recognize the predetermined scene. In addition, the execution status detecting unit 409 may be configured to detect the various predetermined scenes based on values in the memory, values of the register or a program counter, or the like of the game machine reproduced by the emulator 406 or the simulator within the predetermined scene or, in the case where the game machine is implemented, based on the values in the memory, the values of the register or the program counter, or the like of the game machine.

More specifically, for example, the execution status detecting unit 409 may be configured to detect the various predetermined scenes by previously storing the values of the image information, the sound information, the program counter, and the like within the above-mentioned various predetermined scenes in, for example, the memory unit 203 or the database, and comparing the values of the image information, the sound information, the program counter, and the like obtained from the execution unit 405 with the stored values of the image information, the sound information, the program counter, and the like.

The image information generating unit 410 generates, for example, the image information for overlaying and displaying, on a play screen of the game program, a controller assignment window described later or a window indicating that the connection to the operation unit 205 corresponding to a given user has been disconnected. Note that, in addition to the above-mentioned window, the image information generating unit 410 may generate the image information for displaying, on the above-mentioned play screen, information such as a user name, for identifying the user who is currently playing the game program. In this case, for example, the user who is currently playing or watching the game program can grasp a change of the user as described later and which user is currently playing.

The image information transmitting unit 411 transmits the image information on the game generated by the execution unit 405 and the above-mentioned image information generated by the image information generating unit 410 to each corresponding terminal 103. Note that, the image information transmitting unit 411 may compress the image information before transmitting the image information to each terminal 103. Further, the image information may include the sound information.

Based on the assignment table stored in the assignment table storing unit 413, the assignment unit 412 inputs the pieces of operation information, which have been input from the respective operation units 205 and obtained by the above-mentioned operation information obtaining unit 401, to the respective ports of the controller port 404. Specifically, for example, as illustrated in FIG. 6, the assignment table storing unit 413 stores the assignment table obtained by associating a port ID for identifying each port of the controller port 404 with an operation unit ID for identifying each operation unit. Then, based on the assignment table, the assignment unit 412 inputs the operation information input from the respective operation units 205 to each port of the controller port 404. Note that, the server 101 may be configured so that the respective pieces of operation information input from the respective operation units 205 are obtained every predetermined period and retained in a memory unit such as the memory (for example, memory unit 105) and that the respective pieces of operation information input from the respective operation units and retained in the memory unit are input to the controller port 404. In this case, for example, assuming that the game program is designed so that the object to be controlled is, for example, operated based on the operation information obtained every frame period in the game program, even in a case where the respective pieces of operation information input from the respective operation units 205 are obtained on the server 101 every period longer than one frame period, a case where the operation information is obtained on the server 101 with a latency due to a failure in a network or the like, or other such case, the game program can be executed by using the respective pieces of operation information retained in the memory unit.

For example, to give the description by using the example of FIG. 6, the assignment unit 412 outputs the operation information input from the operation unit 205 whose operation unit ID is A to the port 1P of the controller port 404, and outputs the operation information input from the operation unit 205 whose operation unit ID is B to the port 2P of the controller port 404. Note that, the same applies to ports 3P and 4P, descriptions of which are omitted. With such a configuration, it is possible to set or change controller assignment (assignment of the respective operation units 205 to the respective ports) based on the assignment table.

Further, the assignment table storing unit 413 may store the assignment table obtained by associating an execution status ID for identifying the above-mentioned predetermined execution status, the port ID, and the operation unit ID with one another. Specifically, the description is made by using the examples illustrated in FIG. 7A or FIG. 7B. Note that, it is assumed that FIG. 7A illustrates an example of the assignment table used in a case where, for example, the game program is a Breakout-type game played by one player, and FIG. 7B illustrates an example of the assignment table used in a case where, for example, the game program is a fighting game played by two players.

In the assignment table illustrated in FIG. 7A, with regard to the execution status ID of a1, the port ID of 1P is associated with A as the operation unit ID, and with regard to the execution status ID of a2, the port ID of 1P is associated with B as the operation unit ID. Note that, the same applies to the execution status ID of a3 and the subsequent execution status IDs, descriptions of which are omitted. Further, it is assumed that the execution status ID corresponds to, for example, each stage. Specifically, for example, each execution status ID is associated with the value of the image information, the program counter, or the like used when each stage is started.

In this case, when the execution status detecting unit 409 detects that the stage corresponding to the execution status ID has been started, based on the assignment table, the assignment unit 412 changes the assignment of the outputs of the respective pieces of operation information obtained by the operation information obtaining unit 401 to the respective ports of the controller.

Specifically, in the case of, for example, FIG. 7A, it is assumed that, for example, the execution status IDs of a1 to a4 correspond to a first stage to a fourth stage, respectively. In this case, the assignment table stores the port ID of 1P in association with and A, B, A, and B as the operation unit IDs in the order of the execution status IDs of a1 to a4, and hence the assignment unit 412 outputs the operation information input from the operation unit 205 whose operation unit ID corresponds to A in the first stage to the port 1P, and when the second stage is started, outputs the operation information input from the operation unit 205 whose operation unit ID corresponds to B in the second stage to the port 1P. The same applies to the third stage and the subsequent stages, descriptions of which are omitted.

Note that, in the above description, it is assumed that each operation unit ID is associated with each user ID. Further, the description is made above by assuming that the execution status ID corresponds to each stage, but the execution status ID may correspond to each character operated by each player, each lap in a case of a race game or the like involving moving around a course, or other such information.

With such a configuration as described above, for example, even if the game program stored in the program storing unit 407 is created so as to be played by only one player, it is possible to add a new way of enjoying that allows each stage to be played by a different user, which is not originally included in the game program. Note that, in the above description, which user plays which stage, in other words, which port the operation information input from which operation unit 205 is assigned to in which stage, for example, may be set in advance by each user by using a chat function or the like, and the assignment table as described above may be stored based on this information.

Further, in the assignment table illustrated in FIG. 7B, with regard to each port ID, a plurality of execution status IDs and a plurality of operation unit IDs are stored in association with each other. Specifically, for example, as illustrated in FIG. 7B, with regard to the port ID of 1P, the execution status IDs of b1 to b4 and the operation unit IDs of A1 to A4 are stored in association with each other, and with regard to the port ID of 2P, the execution status IDs of c1 to c4 and the operation unit IDs of B1 to B4 are stored in association with each other. Further, the execution status IDs of b1 to b4 are each associated with information relating to the character of which the player takes charge. Specifically, for example, the execution status ID of b1 is associated with the value of the image information or the program counter used when the given character appears, and the execution status ID of b2 is associated with the value of the image information or the program counter used when the character is defeated followed by the appearance of the next character.

With this configuration, the execution status detecting unit 409 can, for example, detect the appearance of the character (change of the character) by comparing the above-mentioned image information or the like with the image information or the like obtained from the execution unit 405 and change the assignment to the respective ports to which the respective pieces of operation information input from the respective operation units 205 are output in response to the detection. With this configuration, for example, even in a case where the game program is created by assuming that a match is played by two players, it is possible to allow a larger number of persons to play the match or the like by changing the user who operates the character on a character-to-character basis or the like.

Note that, which user takes charge of which character, in other words, which port the operation information input from which operation unit 205 is assigned to for which character, for example, may be set in advance by each user by using the chat function or the like before the game starts, and the assignment table as described above may be stored. Further, the configuration of the server 101 described above is merely an example, and the present invention is not limited thereto. For example, the server 101 may be realized based on a distributed computing environment such as a so-called cloud service which uses a plurality of application servers, database servers, storage devices, and the like that are communicably connected to one another.

Figure 8:
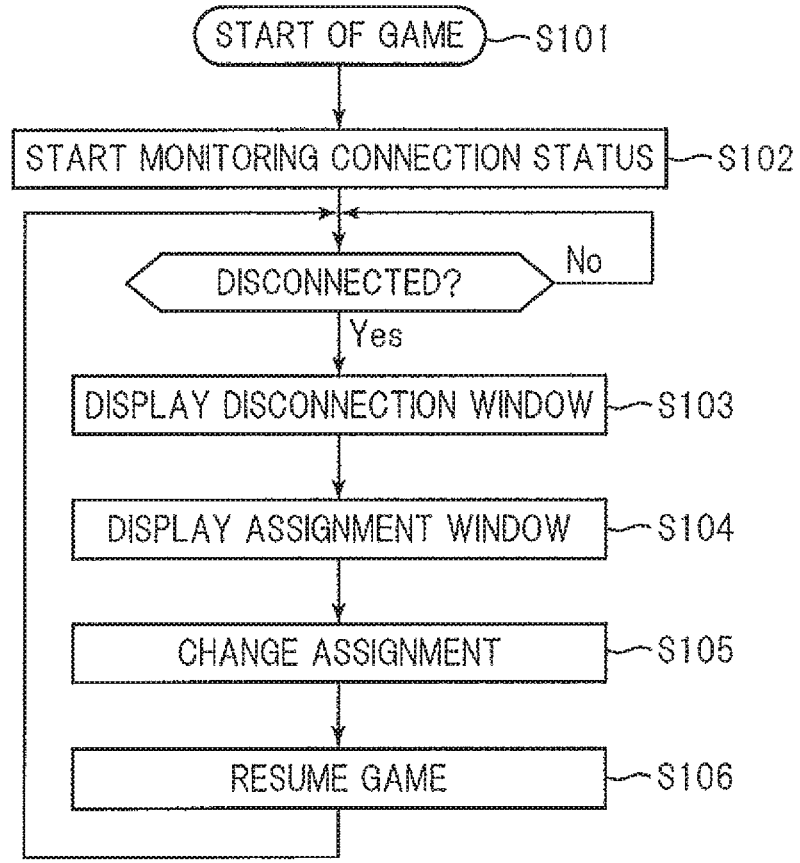
FIG. 8 A diagram illustrating an example of a flow of processing of the information processing system according to this embodiment.

Next, with reference to FIG. 8, by using an example of a case where the game program is a golf game played by four players, a description is made of another example of a flow of processing of the information processing system according to this embodiment. Specifically, the description is made by using an example of a case where the assignment table is set as illustrated in FIG. 6 as described above and where, for example, the connection between the operation unit 205 identified by an operation unit identification information A and the server 101 has been disconnected while the golf game is being played. Note that, as described above, the assignment table illustrated in FIG. 6 represents an assignment table for assigning the respective pieces of operation information input from the operation units 205 identified by operation unit identification information pieces A to D, which correspond to four users (referred to as "users A to D"), respectively, to the respective ports of the controller port 404.

For example, in response to the instruction to start the game issued from the operation unit 205 identified by the operation unit identification information piece A, the execution unit 405 starts the execution of a golf game program stored in the program storing unit 407 (S101). Note that, the description is now made by assuming that the user A corresponding to the operation unit 205 identified by the operation unit identification information piece A issues the instruction to start the game, but another user corresponding to another operation unit 205, for example, the user set as a representative in advance, may issue the instruction to start the game. Further, at this time, the connection status monitoring unit 402 starts monitoring the connection status between the respective operation units 205 corresponding to the operation unit identification information pieces A to D and the server 101 (S102).

Figure 9A:
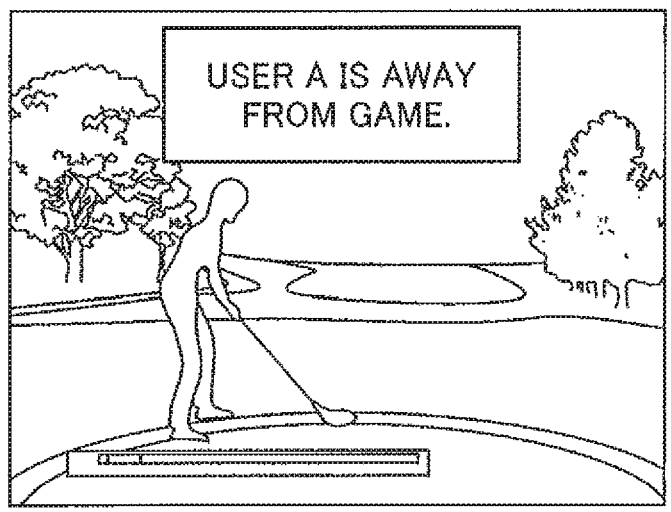
FIG. 9A A diagram illustrating an example of a screen displayed at a time of assignment change.

Then, when the connection status monitoring unit 402 determines that the connection between the server 101 and a given operation unit 205 has been disconnected, the image information generating unit 410 generates, for example, a superimposition image as illustrated in FIG. 9A obtained by superimposing image information for displaying a disconnection window, which identifies the operation unit to which the connection has been disconnected and indicates that the connection to the operation unit has been disconnected, on the play screen of the game, and the image information transmitting unit 411 transmits the superimposition image to the corresponding terminal 103 (S103). Specifically, for example, in the case illustrated in FIG. 9A, the connection between the operation unit 205 and the server 101 has been disconnected, and hence the superimposition image is transmitted to the respective operation units 205 corresponding to the other users B to D. Then, the respective terminals 103 display the superimposition image.

Figure 9B:
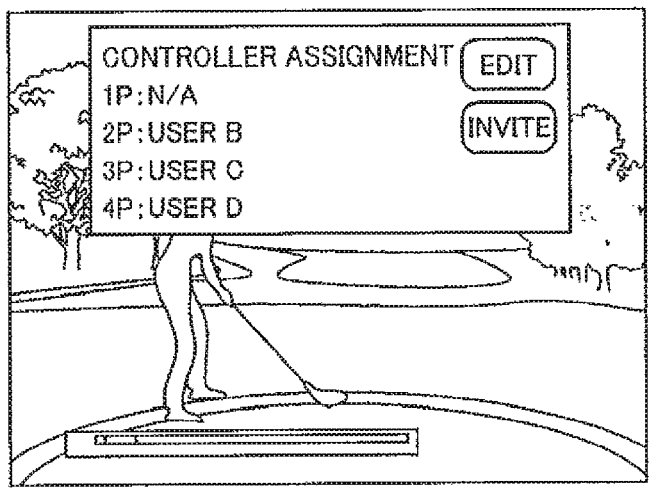
FIG. 9B A diagram illustrating an example of the screen displayed at the time of the assignment change.

Subsequently, the image information generating unit 410 generates, for example, a superimposition image as illustrated in FIG. 9B obtained by superimposing image information for displaying the controller assignment window for changing the assignment of the respective operation units to the respective ports on the play screen of the game, and the image information transmitting unit 411 transmits the superimposition image to the corresponding terminal 103 (S104). Specifically, for example, in the case illustrated in FIG. 9B, the connection to the user A has been disconnected as described above, and hence the user corresponding to a player 1P is displayed as "N/A".

Figure 9C:
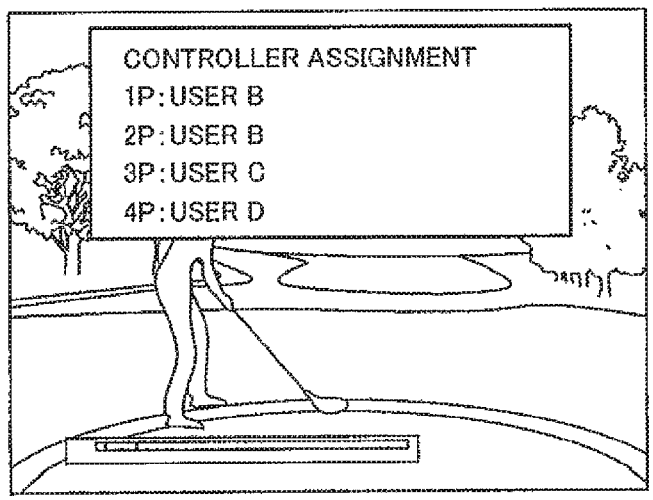
FIG. 9C A diagram illustrating an example of the screen displayed at the time of the assignment change.

Subsequently, the user to which the connection is maintained, for example, any one of the users B to D uses the corresponding operation unit 205 to issue an operation instruction to change the assignment via the respective operation units 205 (S105). Specifically, for example, as illustrated in FIG. 9B, the user B uses the corresponding operation unit 205 to perform a click or the like on an "edit" button image included in the controller assignment window, to thereby assign the user B also to 1P. FIG. 9C indicates how the user B is thus assigned to the controller 1P.

Further, at this time, as illustrated in FIG. 10A, the table management unit 403 changes operation unit identification information whose port ID corresponds to 1P within the assignment table stored in the assignment table storing unit 413 to the user B. Note that, in the above description, as a specific example, the case where the user B assigns the user B to the controller 1P is described, but another user may assign the user B or further another user. Further, only an administrator set from a plurality of users may be allowed to perform the above-mentioned assignment. In this case, the administrator may be set in accordance with a rule or the like set in advance by the system, or the plurality of users may be allowed to set by using the chat function or the like.

Figure 9D:
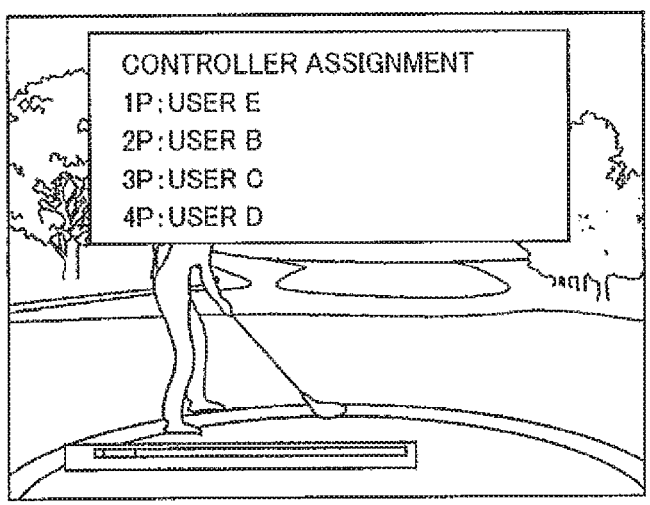
FIG. 9D A diagram illustrating an example of the screen displayed at the time of the assignment change.

Alternatively, for example, in FIG. 9B, the user who is operating the operation unit 205 to which the connection is maintained, in other words, any one of the users B to D may use the corresponding operation unit 205 to perform a click or the like on an "invite" button image included in the controller assignment window, to thereby allow a user (for example, user E) who is not currently playing the golf game to join the golf game as the player 1P by using the corresponding operation unit 205. FIG. 9D illustrates how the user E is thus assigned to 1P. For example, the user E may be a user who is watching the playing of the users A to D or a user who has submitted a request for a match to be registered as being in a state of looking for an available game or other such state.

Further, at this time, as illustrated in FIG. 10B, the table management unit 403 changes the operation unit identification information whose port ID corresponds to 1P within the assignment table stored in the assignment table storing unit 413 to identification information E being the identification information input from the operation unit 205 operated by the user E.

After the assignment table has been changed as described above, the execution unit 405 resumes the game (S106). At this time, based on the above-mentioned assignment table that has been changed, the assignment unit 412 inputs the operation information input from the respective operation units 205 to the respective ports of the controller port 404. After that, the processing of Steps S103 to S106 is repeated. Note that, here, also during the execution of the game program, the information for identifying the user assigned to each player, for example, the user name or the like, may be displayed on the display unit 204 of the terminal 103 corresponding to the user who is playing or watching the game program. In this case, for example, the user who is playing or watching the game program can grasp the change of the user and which user is currently playing.

As described above, for example, another player can continue the playing in place of the user who can no longer continue the playing or the user who does not desire to continue the playing. Specifically, for example, in a case illustrated in FIG. 10A, by assigning the operation information whose operation ID is B to the port 1P in place of the operation information input from the operation unit 205 whose operation ID is A, the user B can take charge of the players 1 and 2 in place of the user A who has been in charge of the player 1. Further, for example, in a case illustrated in FIG. 10B, by assigning the operation information whose operation ID is E to the port 1P in place of the operation information input from the operation unit 205 whose operation ID is A, the user E can take charge of the player 1 in place of the user A who has been in charge of the player 1.

With such a configuration as described above, for example, while the match is played by a plurality of persons, even when one user goes off-line or the like to find it difficult to continue the game or when the one user no longer wishes to continue the game, by changing the details of the assignment table, it is possible to allow another user to take over the playing from the one user.

Note that, the flow of the processing described above is merely an example, and the present invention is not limited thereto. For example, in place of the user's instruction, when the connection status monitoring unit 402 determines that the connection between a given port and one operation unit 205 has been disconnected, the assignment between the operation unit 205 and the port may be changed without the user's instruction, for example, the operation unit 205 that is set in advance may be connected in place of the operation unit 205 that has been connected to the port or the like.

Next, a description is made of another example of the flow of the processing of the information processing system according to this embodiment by using the case where the game program stored in the program storing unit 407 is a Breakout-type game played by one player or a fighting game in which a match is played by two players.

First, as described above, before the game starts, by having each user select which stage is to be played by which user, which user is to take charge of which character, and the like, the assignment table storing unit 413 stores, for example, the above-mentioned assignment table as illustrated in FIGS. 7A and 7B.

When the game is started, the execution status detecting unit 409 starts the detection of the predetermined execution status. As described above, the execution status is associated with the execution status ID. For example, in FIG. 7A, the stage 1 corresponds to the execution status ID of a1 and the stage 2 corresponds to the execution status ID of a2 or the like, while in FIG. 7B, the first character corresponds to the execution status ID of b1 and the next character corresponds to the execution status ID of b2 or the like.

Then, when the execution status detecting unit 409 detects the predetermined execution status (corresponding to the execution status ID), the operation information input from the operation unit 205 having the operation unit ID stored in association with the execution status ID stored in the assignment table is changed so as to be input to the port indicated by the port ID stored in association therewith.

Specifically, to give the description by taking the example of FIG. 7A, first, the operation information input from the operation unit ID of A is input to the port identified by the port ID of 1P. Subsequently, when the execution status detecting unit 409 detects a screen that has shifted to the stage 2 corresponding to the execution status ID of a2 by the image recognition or the like, the assignment unit 412 inputs the operation information input from the operation unit ID stored in association with the execution status ID of a2 to the port ID of 1P. The subsequent flow is similar to the above explained, descriptions of which are omitted. With this configuration, for example, when a shift is made from the stage 1 to the stage 2, the operation unit for operating the object to be controlled of the game program can be changed from the operation unit whose operation unit ID is A to the operation unit having the operation unit ID of B. In other words, the user who operates the object to be controlled of the game can be changed depending on the stage.

Further, to give the description by taking the example of FIG. 7B, first, the operation information input from the terminal 103 having the operation unit ID of A1 is input to the port identified by the port ID of 1P. Subsequently, when the execution status detecting unit 409 detects a screen on which the character corresponding to the execution status ID of b2 has appeared by the image recognition or the like, the assignment unit 412 inputs the operation information input from the operation unit 205 having the operation unit ID stored in association with the execution status ID of b2 to the port ID of 1P. The subsequent flow is similar to the above explained, descriptions of which are omitted. With this configuration, for example, when the character corresponding to the execution status ID of b1 is defeated followed by the appearance of the character corresponding to the execution status ID of b2, the operation unit for operating the object to be controlled of the game program can be changed from the operation unit having the operation unit ID of A1 to the operation unit having the operation unit ID of A2.

As described above, depending on the detection of the predetermined execution status, for example, the case where the stage has progressed, the case where the first character is defeated followed by the appearance of the next character, or the like, the user who plays the game can be changed by changing the assignment of the respective pieces of operation information input to the respective operation units 205 to the respective ports. Note that, the flow of the processing described above is merely an example, and the present invention is not limited thereto. For example, by using a combination of sets of processing described above with reference to FIG. 7 and FIG. 10, for example, the assignment of the respective operation units to the respective ports may be changed depending on the connection status and the execution status.

Note that, the present invention is not limited to the embodiment described above, and is receptive to various modifications. For instance, the configuration described above can be replaced with substantially the same configuration, a configuration that provides the same actions and effects, or a configuration that accomplishes the same object as the one described above in the embodiment.

For example, with regard to the change of the above-mentioned assignment table, in addition to the above-mentioned playing of a one-player game by taking turns in each stage or the like, for example, with the user corresponding to a master and the user corresponding to an apprentice set in advance, the master may instruct to change the assignment of the operation unit 205 of the master to the port to which the operation unit 205 of the apprentice is connected while watching the play screen of the apprentice, to thereby operate the character being operated by the apprentice by using the operation unit 205 used by the master only when the master feels that the operation performed by the apprentice is inappropriate or in other such occasion.

In addition, in a case where the game program is a puzzle game, a shooting game, or the like, the users may take turns to proceed with the game as the need arises. Specifically, for example, with regard to the change of the assignment, as described above, the users may take turns to proceed with the game as the need arises in response to a predetermined user's instruction issued through the operation unit 205, the detection of the predetermined scene, or the like. Here, in the case where the users may take turns in response to the user's instruction issued through the operation unit 205, the assignment may be changed on a menu screen for the assignment change, or a switch button may be assigned to a given button of the operation unit 205 in order to perform smooth switching. Further, for example, another user who makes a request for a match when a given user is playing the game as 1P (player 1) may automatically join the game as the player 2. In this case, in response to the request for a match made by the another user, the assignment table may be changed so that, for example, the operation information input from the operation unit 205 used by the another user is assigned to the port 2P. Note that, in this case, it is assumed that the assignment table before the request for a match was set so that the operation information input from the operation unit 205 used by the user corresponding to the player 1 was assigned to the port 1P.

In addition, with regard to the above-mentioned change of the assignment, for example, which operation information input from the operation unit 205 used by which user is to be enabled (assigned to the port) may be switched among the plurality of users registered in advance in a predetermined order or randomly every fixed time. For example, in the fighting game or the like, teams, groups, or the like may be allowed to play a match or the like with each other.

Modified Example 1

Next, Modified Example 1 is described. Note that, in the following, descriptions of the same points as described above are omitted. Further, in the following, for example, the description is made mainly by using a case where the game program to be executed is created so that one player uses four pieces of operation information, for example, four buttons to operate the object to be controlled, but the game program may be created so that the object to be controlled is operated based on the operation information input from another number of buttons, analog operation units 303, acceleration sensors, or the like.

In this modified example, the assignment table storing unit 413 stores, for example, as illustrated in FIG. 11, the assignment table in which operation information IDs, operation unit IDs, and input information IDs are stored in association with the port IDs. Here, the operation information IDs are IDs for identifying the respective pieces of operation information assumed in the game program, and in a case where, for example, the game program is created so as to be operated by one player using four buttons, correspond to information pieces for identifying the four buttons. The input information IDs correspond to information pieces for respectively identifying the respective pieces of input information input to the operation unit 205, for example, buttons or the like associated with the above-mentioned four buttons.

Specifically, for example, as illustrated in FIG. 11, with regard to the port ID of 1P, the operation information IDs of a to d are associated with the input information IDs of aa to dd, respectively, and the operation information ID of a and b are associated with the operation unit IDs of A and B, respectively. Note that, the similar explanation is applied to the port ID of 2P, a description of which is omitted.

Based on the assignment table, the assignment unit 412 assigns the respective pieces of input information indicated by the respective input information IDs to the respective pieces of operation information indicated by the respective operation information IDs. Specifically, for example, in the case illustrated in FIG. 11, the input information which is input to the operation unit identified by the operation unit ID of A and which is identified by the input information IDs of aa and bb is assigned to the operation information identified by the operation information IDs of a and b to be input to the port ID of 1P. Further, the input information which is input to the operation unit identified by the operation unit ID of A and which is identified by the input information IDs of cc and dd is assigned to the operation information identified by the operation information IDs of c and d to be input to the port ID of 1P.

With such a configuration, the plurality of users can share a plurality of pieces of operation information operated by the player 1 in the game program. Specifically, for example, in a case where the respective pieces of operation information indicated by the operation information IDs of a and b correspond to the information input to buttons a and b for the player 1 of the game program, and the pieces of operation information indicated by the operation information IDs c and d correspond to the information input to buttons c and d for the player 1 of the game program, the user A may take charge of the buttons a and b, and the user B may take charge of the buttons c and d. Note that, the same applies to the player 2 of the game program, a description of which is omitted. Further, the respective operation unit IDs are associated with the respective user IDs, and the respective users use the respective operation units 205 corresponding thereto to input the respective pieces of input information identified by the input information IDs.

Next, by using the above-mentioned example, a description is made of an example of the flow of the processing of the information processing system according to this modified example. First, for example, as described above, before the game starts, by having each user select which user is to take charge of which player (player 1 or 2) of the game and which user is to take charge of which button for which player, the assignment table storing unit 413 stores the above-mentioned assignment table as illustrated in FIG. 11.

Then, when the game is started, based on the assignment table set as described above, the assignment unit 412 assigns the respective pieces of identification information identified by the respective pieces of input information identification ID input from the respective operation units as the respective pieces of operation information identified by the respective operation information IDs. Specifically, to give the description by using the example illustrated in FIG. 11, as described above, the information input from the respective operation units 205 whose operation unit IDs correspond to A and B is input to the 1P port of the controller port 404. Specifically, to the 1P port, the respective pieces of input information indicated by the input information IDs of aa and bb input to the operation unit 205 whose operation unit ID is A are input as the respective pieces of operation information having the operation information IDs of a and b, the respective pieces of input information indicated by the input information IDs of cc and dd input to the operation unit 205 whose operation unit ID is A are input as the respective pieces of operation information having the operation information IDs of c and d, and other such information is input.

With such a configuration as described above, the respective pieces of input information input through the plurality of operation units 205 can be input as the respective pieces of operation information to be input to one port of the controller port 404. Therefore, for example, a plurality of buttons or the like used to operate a given object to be controlled can be operated by being shared on a user-to-user basis. Specifically, for example, in the case where the game program is a shooting game, the user A can take charge of a direction operation (corresponding to, for example, buttons a and b) for a fighter plane operated by the user, while the user B can take charge of launch buttons (corresponding to, for example, buttons c and d) for two kinds of missile, and other such sharing is possible. With this configuration, for example, even in the game program created by assuming one player, it is possible to realize a so-called cooperative play or shared play that allows a plurality of players to play by sharing the plurality of buttons or the like included in one controller used in the game on a user-to-user basis (on an operation unit-to-operation unit basis).

Note that, the present invention is not limited to the above-mentioned embodiment or Modified Example 1, and various modifications can be made. For example, the above-mentioned configuration can be replaced with substantially the same configuration, a configuration that provides the same actions and effects, or a configuration that accomplishes the same object as the one described in the above-mentioned embodiment or Modified Example 1. For example, the above-mentioned embodiment and Modified Example 1 may be combined to perform the changing, the setting, or the like for the assignment of the respective pieces of input information input to the operation unit 205 to the operation information, for example, in response to the user's instruction in the middle of the game or in response to the detection of the above-mentioned predetermined scene, for example, in each stage, for each character, or every predetermined time.

Modified Example 2

Next, Modified Example 2 is described. Note that, in the following, descriptions of the same points as those of the embodiment or Modified Example 1 described above are omitted. Further, as in Modified Example 1, for example, the description is made mainly by using a case where the game program to be executed is created so that one player uses four pieces of operation information, for example, four buttons to operate the object to be controlled, but the game program may be created so that the object to be controlled is operated based on the operation information input from another number of buttons, analog operation units 303, acceleration sensors, or the like.

In this modified example, as in Modified Example 1, the assignment table storing unit 413 stores, for example, as illustrated in FIG. 12, the assignment table in which operation information IDs, operation unit IDs, and input information IDs are stored in association with the port IDs. However, this modified example is different in that a plurality of operation unit IDs are associated with one operation information ID.

Specifically, for example, as illustrated in FIG. 12, with regard to the port ID of 1P, two operation unit IDs of A and B are stored in association with the operation information ID of c, and two operation unit IDs of A and B are stored in association with the operation information ID of d.

Based on the assignment table, the assignment unit 412 assigns the respective pieces of input information indicated by the respective input information IDs to the respective pieces of operation information indicated by the respective operation information IDs. Specifically, for example, in the case illustrated in FIG. 12, as described above in the above-mentioned Modified Example 1, the input information which is input to the operation unit identified by the operation unit ID of A and which is identified by the input information IDs of aa and bb is input as the respective pieces of operation information identified by the operation information IDs of a and b to be input to the port ID of 1P. On the other hand, the input information which is input to the operation unit identified by the operation unit IDs of A and B and which is identified by the input information IDs of cc and dd is input as the respective pieces of operation information identified by the operation information IDs of c and d to be input to the port ID of 1P.

With such a configuration, the operation information created so as to be input by the player 1 in the game program can be shared by the plurality of users, and in addition, one or all pieces of input information input by the player 1 can be shared by different users with overlaps. Specifically, in the case of the above-mentioned example, for example, in the case where the pieces of operation information indicated by the operation information IDs c and d correspond to the information input to the buttons c and d for the player 1 of the game program, both the users A and B may take charge of the buttons c and d. Note that, the same applies to the player 2 of the game program, descriptions of which are omitted.

Next, by using the above-mentioned example, a description is made of an example of the flow of the processing of the information processing system according to this modified example. First, for example, as described above, before the game starts, by having each user select which user is to take charge of which player (for example, player 1 or 2) of the game and which user is to take charge of which button for which player, the assignment table storing unit 413 stores the above-mentioned assignment table as illustrated in FIG. 12.

Then, when the game is started, based on the assignment table set as described above, the assignment unit 412 assigns the respective pieces of identification information identified by the respective pieces of input information identification ID input from the respective operation units 205 as the respective pieces of operation information identified by the respective operation information IDs. Specifically, to give the description by using the example illustrated in FIG. 12, as described above, the information input from the respective operation units 205 whose operation unit IDs correspond to A and B are input to the 1P port of the controller port 404. Specifically, to the 1P port, the respective pieces of input information indicated by the input information IDs of aa and bb input to the operation unit 205 whose operation unit ID is A are input as the respective pieces of operation information having the operation information IDs of a and b, the respective pieces of input information indicated by the input information IDs of cc and dd input to the operation units 205 whose operation unit IDs correspond to A and B are input as the respective pieces of operation information having the operation information IDs of c and d, and other such information is input.

With such a configuration as described above, the pieces of operation information input through the plurality of operation units 205 can be input to one port of the controller port 404 with overlaps. Therefore, for example, in the case where the game program is a shooting game, the user A can take charge of the direction operation (corresponding to, for example, buttons a and b) for the own fighter plane, while both the users A and B can take charge of the launch buttons (corresponding to, for example, buttons c and d) for the two kinds of missile, and other such sharing is possible. With this configuration, for example, in a case where continuous hitting or the like of the launch buttons is desired, the input information may be input with overlaps by the users A and B pressing down the buttons c and d, to thereby realize the so-called cooperative play, shared play, or the like. For example, in a case of a game relating to a fastest-finger-first quiz, simultaneous inputs from a plurality of users in each group may be enabled, to thereby realize a so-called cooperative match play on a group-to-group basis.

Note that, the present invention is not limited to the above-mentioned embodiment or Modified Example 1 or 2, and is receptive to various modifications. For instance, the configuration of the above-mentioned embodiment or Modified Example 1 or 2 can be replaced with substantially the same configuration, a configuration that provides the same actions and effects, or a configuration that accomplishes the same object as the one described above in the above-mentioned embodiment or Modified Example 1 or 2. For example, the above-mentioned embodiment, and Modified Examples 1 and 2 may be combined to perform the changing, the setting, or the like for the assignment of the respective pieces of input information input to the operation unit to the operation information, even in the case of the overlapped assignment as described above, for example, in response to the user's instruction in the middle of the game or in response to the detection of the above-mentioned predetermined scene, for example, in each stage, for each character, or every predetermined time. In addition, the description has been made above of the information processing system including the server 101 and the respective terminals 103, but the terminal 103 itself may include a part or all of the functions of the above-mentioned server 101, for example, the execution unit 405, the controller port 404, and the assignment unit 412 described above, to thereby dynamically change the assignment of the plurality of terminals 103 connected to the terminal 103 to the controller port 404 as described above.

The invention claimed is:

1. An information processing system, comprising:
   a controller port comprising a plurality of ports to which a plurality of operation signals are input from a plurality of operation devices via a network;
   an execution unit configured to execute a game program in response to each of the plurality of operation signals input from each of the plurality of operation devices to each of the plurality of the ports;
   an assignment unit configured to assign each of the plurality of operation devices to the plurality of respective ports;
   a connection information obtaining unit configured to obtain connection information indicating a connection status between the plurality of ports and the plurality of operation devices; and
   an image information generating unit configured to generate image information that is obtained by associating information corresponding to each of the plurality of ports with information corresponding to each of the plurality of operation devices,
   wherein the assignment unit changes the assignment of the plurality of operation devices to the plurality of ports: (i) depending on the obtained connection status; and (ii) in response to a user's instruction for assignment based on the image information.

2. The information processing system according to claim 1, wherein the image information generating unit is configured to generate image information containing a message indicating which of the plurality of operation devices were previously connected, but are no longer connected, to at least one of the plurality of ports based the connection information, wherein the message, when displayed on the one or more of the plurality of operation devices that remain connected to at least one of the plurality of ports, provides an indication to users of the one or more of the plurality of operation devices of such connection information.

3. The information processing system according to claim 2,
wherein the image information generating unit is configured to generate an assignment modification image, which is transmitted to and displayed on the one or more of the plurality of operation devices that remain connected to at least one of the plurality of ports;
wherein the assignment modification image permits at least one of the one or more of the plurality of operation devices that remain connected to at least one of the plurality of ports to provide the user's instruction for assignment modification; and
wherein the assignment unit changes the assignment of at least one of the plurality of operation devices to the plurality of ports in response to the user's instruction for assignment modification.

4. The information processing system according to claim 1, wherein the assignment unit assigns one operation device among the plurality of operation devices to at least two ports among the plurality of ports.

5. The information processing system according to claim 1, further comprising an execution status detecting unit configured to detect a predetermined execution status of the execution unit;
wherein the assignment unit changes the assignment of the plurality of operation devices to the plurality of ports based on the detected execution status.

6. The information processing system according to claim 5, wherein the execution status detecting unit detects the predetermined execution status by using image processing.

7. The information processing system according to claim 1, wherein the assignment unit changes the assignment of the plurality of operation devices to the plurality of ports based on allocation information obtained by storing respective pieces of port identification information for identifying each of the plurality of ports in association with respective pieces of operation device identification information for identifying each of the plurality of operation devices.

8. The information processing system according to claim 7, wherein the allocation information stores execution status identification information for identifying predetermined execution status in association therewith.

9. The information processing system according to claim 5, wherein allocation information is updated based on the detected execution status.

10. The information processing system according to claim 8, wherein the assignment unit changes the assignment of each of the plurality of operation devices to each of the plurality of ports based on the updated allocation information.

11. An information processing method, comprising:
receiving a plurality of operation signals from a plurality of operation devices via a network and inputting the plurality of operation signals into a plurality of ports of a controller port;
executing a game program in response to each of the plurality of operation signals that are input to each of a plurality of ports of the controller port;
assigning the plurality of the operation devices to the plurality of ports;
obtaining connection information indicating a connection status between the plurality of ports and the plurality of operation devices;
generating image information that is obtained by associating information corresponding to each of the plurality of ports with information corresponding to each of the plurality of operation devices; and
changing the assignment of the plurality of operation devices to the plurality of ports: (i) depending on the obtained connection status, and (ii) in response to a user's instruction for assignment based on the image information.

12. The information processing method according to claim 11, further comprising generating image information containing a message indicating which of the plurality of operation devices were previously connected, but are no longer connected, to at least one of the plurality of ports based the connection information, wherein the message, when displayed on the one or more of the plurality of operation devices that remain connected to at least one of the plurality of ports, provides an indication to users of the one or more of the plurality of operation devices of such connection information.

13. The information processing method according to claim 12, further comprising:
generating an assignment modification image, which is transmitted to and displayed on the one or more of the plurality of operation devices that remain connected to at least one of the plurality of ports, where the assignment modification image permits at least one of the one or more of the plurality of operation devices that remain connected to at least one of the plurality of ports to provide the user's instruction for assignment modification; and
changing the assignment of at least one of the plurality of operation devices to the plurality of ports in response to the user's instruction for assignment modification.

14. The information processing method according to claim 11, further comprising assigning one operation device among the plurality of operation devices to at least two ports among the plurality of ports.

15. The information processing method according to claim 11, further comprising:
detecting a predetermined execution status of the execution unit; and
changing the assignment of the plurality of operation devices to the plurality of ports based on the detected execution status.

16. The information processing method according to claim 15, further comprising detecting the predetermined execution status by using image processing.

17. The information processing method according to claim 11, further comprising changing the assignment of the plurality of operation devices to the plurality of ports based on allocation information obtained by storing respective pieces of port identification information for identifying each of the plurality of ports in association with respective pieces of operation device identification information for identifying each of the plurality of operation devices.

18. The information processing method according to claim 17, wherein the allocation information stores execution status identification information for identifying predetermined execution status in association therewith.

19. The information processing method according to claim 17, wherein allocation information is updated based on the detected execution status.

20. The information processing system according to claim 17, further comprising changing the assignment of each of the plurality of operation devices to each of the plurality of ports based on the updated allocation information.

21. An apparatus, including a microprocessor operating under control of an information processing computer program for causing a computer to function as:

a controller port comprising a plurality of ports to which a plurality of operation signals are input from a plurality of operation devices via a network;

an execution unit configured to execute a game program in response to each of the plurality of operation signals input from each of the plurality of operation devices to each of the plurality of the ports;

an assignment unit configured to assign each of the plurality of operation devices to the plurality of respective ports;

a connection information obtaining unit configured to obtain connection information indicating a connection status between the plurality of ports and the plurality of operation devices; and an image information generating unit configured to generate image information that is obtained by associating information corresponding to each of the plurality of ports with information corresponding to each of the plurality of operation devices, wherein the assignment unit changes the assignment of the plurality of operation devices to the plurality of ports: (i) depending on the obtained connection status; and (ii) in response to a user's instruction for assignment based on the image information.

22. A non-transitory, computer-readable information storage medium having stored thereon the information processing computer program according to claim 21.

* * * * *